US006865015B2

(12) United States Patent
Neuhauser

(10) Patent No.: US 6,865,015 B2
(45) Date of Patent: Mar. 8, 2005

(54) METHOD AND TRANSMISSION SYSTEM FOR OPTIMIZATION OF THE TRANSMISSION CHARACTERISTICS OF AN OPTICAL WAVELENGTH DIVISION MULTIPLEX SYSTEM

(75) Inventor: Richard Neuhauser, Neufahrn (DE)

(73) Assignee: Siemens Aktiengesellschaft, Munich (DE)

(*) Notice: Subject to any disclaimer, the term of this patent is extended or adjusted under 35 U.S.C. 154(b) by 234 days.

(21) Appl. No.: 10/133,669

(22) Filed: Apr. 25, 2002

(65) Prior Publication Data

US 2002/0191903 A1 Dec. 19, 2002

(30) Foreign Application Priority Data

Apr. 25, 2001 (DE) ........................................ 101 20 276

(51) Int. Cl.[7] ................................................ H01S 3/00
(52) U.S. Cl. .................................... 359/334; 359/337.4
(58) Field of Search .............................. 359/334, 337.4

(56) References Cited

U.S. PATENT DOCUMENTS 6,433,922 B1 * 8/2002 Ghera et al. ................ 359/334
6,452,716 B1 * 9/2002 Park et al. .................. 359/334
6,624,926 B1 * 9/2003 Hayashi et al. ............. 359/334
6,690,504 B1 * 2/2004 Nagel et al. ................ 359/334

FOREIGN PATENT DOCUMENTS

| EP | 1 018 666 | 7/2000 |
|---|---|---|
| EP | 1 182 808 | 2/2002 |

OTHER PUBLICATIONS

"Optical Fiber Telecommunications", IIIA, Kaminov et al.
"Fiber Optics Communication Systems", Ajrawal, 2nd Edition, pp. 323–328.

* cited by examiner

*Primary Examiner*—Mark Hellner
(74) *Attorney, Agent, or Firm*—Bell Boyd & Lloyd LLC

(57) ABSTRACT

In the case of broadband optical transmission, the quality of a wavelength division multiplex (WDM) signal which has a number of channels is adversely affected by different channels levels or signal-to-noise ratios, as well as by signal distortion. A method for optimization of the characteristics of a transmission system having cascaded Raman amplifiers, which each have a number of pump sources, for amplification of the (WDM) signal is described, using a quality parameter which is optimized as well as possible for each channel at the transmission path end. The method is particularly suitable for high levels of nonlinear signal distortion, and ensures compensation for and optimization of the qualify parameters for all the channels at the transmission path end. Different Raman gain profiles are selected as a function of the spectrum of the quality parameter by controlling the pump currents of the pump source of at least one of the Raman amplifiers.

8 Claims, 3 Drawing Sheets

G/dB
16
15
14
13
12
11
10
9
8
7
6
1520
1530
1540
1550
1560
1570
1580
1590
1600
1610
λ/nm

Rx
Rx
M
DEMUX
RVN
R
RV2
RV1
LWL
B
MUX
S
K1
KM
Tx
Tx

METHOD AND TRANSMISSION SYSTEM FOR OPTIMIZATION OF THE TRANSMISSION CHARACTERISTICS OF AN OPTICAL WAVELENGTH DIVISION MULTIPLEX SYSTEM

BACKGROUND OF THE INVENTION

The transmission capacity of optical transmission systems can be increased by multiplexing channels, which have a number of different wavelengths, of an optical wavelength division multiplex (WDM) signal. Due to the wavelength dependency of optical components and effects, the channels have different levels, signal-to-noise ratios and/or signal distortion at the end of the transmission path; for example, in the form of nonlinearities. Ideally, the channels should have a flat gain spectrum after being amplified one or more times along the transmission path. By way of example, a transmission system having a number of cascaded Raman amplifiers has been proposed in Patent Application DE 10057659.1, in order to achieve the flat gain spectrum.

In conventional WDM transmission systems, identical channel levels are set for all the channels at the start of the transmission path via variable attenuaters. However, the wavelength dependency of the optical components results in channel level differences increasing virtually continuously along the path.

Better utilization of the system resources is achieved by the use of pre-emphasis for the channel levels at the start of the transmission path. The distribution of the channel levels is chosen at the start of the path such that all the channels have the same signal-to-noise ratios OSNR at the end of the path. This OSNR pre-emphasis with signal-to-noise ratio control is highly suitable when there is little signal distortion or for so-called noise-limited systems.

A further improved method is the Q-pre-emphasis proposed in Patent Application DE 10047342.3, in which the level distribution of the channels at the start of the transmission path is chosen such that the channels have the same values of the Q factor at the end of the transmission path (see "Optical Fiber Telecommunications", IIIA, I. P. Kaminow, T. L. Kich, p. 316, 1997, ISBN 0-12-395170-4). The channels with a poor Q factor are raised at the start of the transmission path in order to compensate for the poor signal quality by improved signal-to-noise ratios OSNR at the path end. Since the Q-factor represents a direct measure of the signal quality, the Q-pre-emphasis has the advantage over the previously cited OSNR pre-emphasis that, in addition to the OSNR compensation, a large number of additional limiting effects are taken into account, such as nonlinear signal distortion, different dispersion compensation between the channels, different transmitter or receiver characteristics, and crosstalk due to multiple reflections.

In addition to the Q-factor as a measure of the signal quality, equivalent quality parameters also can be used, such as the bit error rate BER or the number of corrected bits in systems using forward error correction (FEC).

In systems with high channel levels at the start of the transmission path, OSNR-pre-emphasis or Q-pre-emphasis results in high levels of signal distortion due to nonlinear effects such as Four Wave Mixing, Self Phase Modulation, Cross Phase Modulation, Stimulated Raman Scattering (see "Fiber-Optic Communication Systems", G. P. Agrawal, 2nd Edition, pp. 323–328). This nonlinear distortion is not compensated for by improving the signal-to-noise ratios OSNR when increasing individual channel levels. FIG. 1 shows the Q-factor for optimal dispersion in a transmission system having 8 channels (100 GHz channel separation, 10 Gb/s data rate and NRZ coding), as a function of the input power $P_{in}$ of the channels. The channel quality Q initially rises linearly as the input power $P_{in}$ increases, but enters saturation with the nonlinear effect becoming increasingly significant at high input power levels and then falls again for even higher power levels.

An object of the present invention is, therefore, to ensure an improvement in the transmission quality for a wavelength division multiplex system with broadband cascaded Raman amplifiers; in particular, in the presence of high levels of nonlinear signal distortion.

SUMMARY OF THE INVENTION

The method according to the present invention for optimization of the transmission characteristics of a wavelength division multiplex system having cascaded Raman amplifiers, which each have a number of pump sources, for Raman amplification of a WDM signal which has a number of channels has an optimized quality parameter for each channel of the WDM signal at the transmission path end. The quality parameter is suitable for determining signal distortion. Depending on the spectrum of the quality parameter, different Raman gain profiles are newly selected for at least one of the Raman amplifiers in order to compensate for, and optimize, the quality parameters for all the channels.

The Q-factor or bit error rate is calculated via an appropriate measurement device as a suitable quality parameter. In the case of secure data transmission via an error-correcting code, the bit error rate is determined, for example, by the number of corrected bits.

There is no need for pre-emphasis of the channels of the WDM signal at the start of the transmission path for initial adjustment of the quality parameter and/or of the signal-to-noise ratios. Since the channel levels are correspondingly low at the start of the transmission path, there is only little nonlinear signal distortion. Any required pre-emphasis can be arranged at the end of the transmission path for matching to the low channel levels in order that no nonlinear effects occur at high levels.

Should the channels of the start of the transmission path also be subjected to pre-emphasis for initial adjustment of the quality parameter and/or of the signal-to-noise ratios, the measurement device which is arranged at the end of the transmission path will be able to compensate for high levels of signal distortion and high signal-to-noise ratios between the channels by readjustment of the Raman gain profiles.

In a transmission system with little nonlinear signal distortion, a second measurement device may be arranged at the end of the transmission path in order to determine the signal-to-noise ratios of each of the channels. Furthermore, different Raman gain profiles may be newly set for each of the Raman amplifiers, via an additional controller, in order to compensate for and to maximize the signal-to-noise ratios (OSNR).

Suitable selection and control of individual pump currents in the broadband Raman amplifiers makes it possible to set different Raman gain profiles and, thus, to optimally match the quality parameter and/or the signal-to-noise ratios of the channels at the path end.

Additional features and advantages of the present invention are described in, and will be apparent from, the following Detailed Description of the Invention and the Figures.

DETAILED DESCRIPTION OF THE INVENTION

Figure 1:
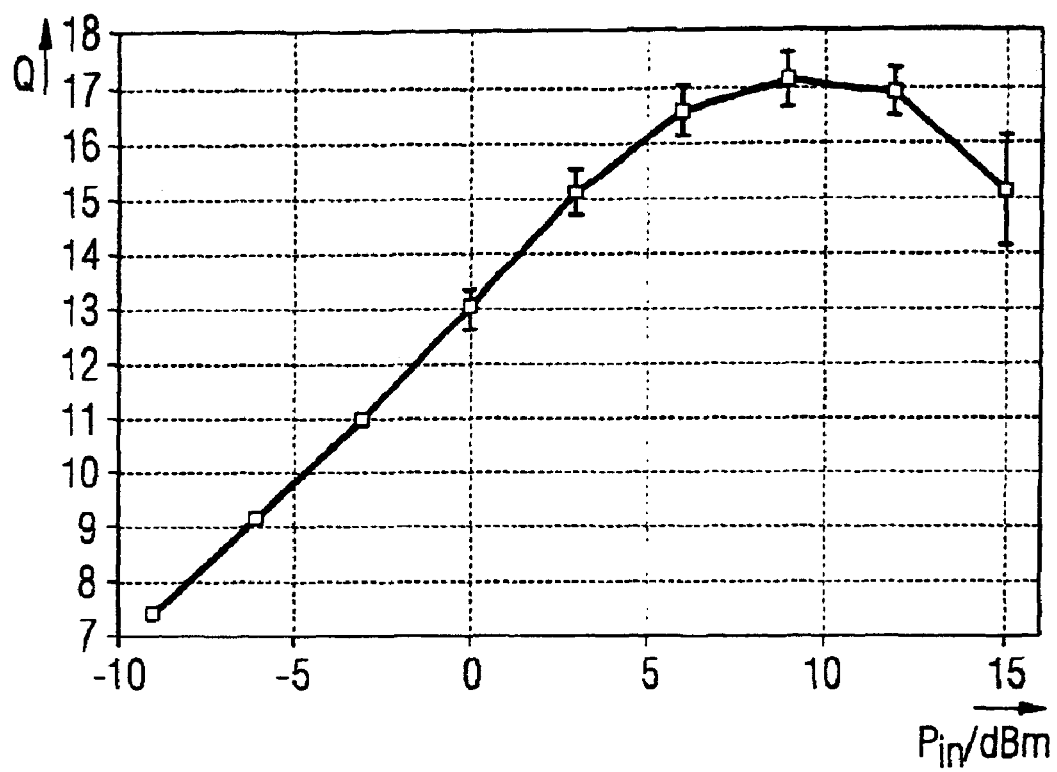
FIG. 1 shows the Q-factor for optimal dispersion in an transmission system having eight channels as a function of the input power of the channels.
Figure 2:
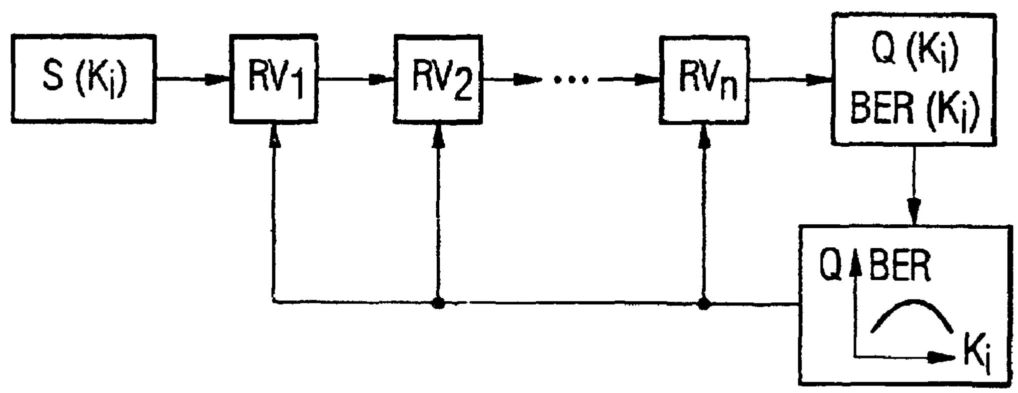
FIG. 2 shows the basic profile of the method according to the present invention for optimization of the transmission quality.

FIG. 2 shows the basic profile of the method according to the present invention for optimization of the transmission quality of the channels $K_i$ of a WDM signal S over a transmission path which has a wavelength division multiplex system with broadband cascaded Raman amplifiers $RV_1$, $RV_2$, . . . . At the end of the transmission path, a quality parameter Q or BER is determined (as a Q-factor Q or as a bit error rate BER) for each channel K in order to produce a spectrum. If the spectrum of the quality parameter Q or BER has particular signal distortion or non uniform signal-to-noise ratios between the channels $K_i$, then different Raman gain profiles are newly selected for at least one of the Raman amplifiers $RV_1$, $RV_2$, . . . in order to compensate for and optimize the quality parameter Q or BER, and they are set via a controller. This controller for the corresponding Raman gain profiles of the Raman amplifiers $RV_1$, $RV_2$, . . . set the pump currents of the pump source of the Raman amplifiers $RV_1$, $RV_2$, . . . such that all the channels $K_i$ have approximately the same, and optimized, quality parameters Q or BER at the end of the transmission path.

Figure 3:
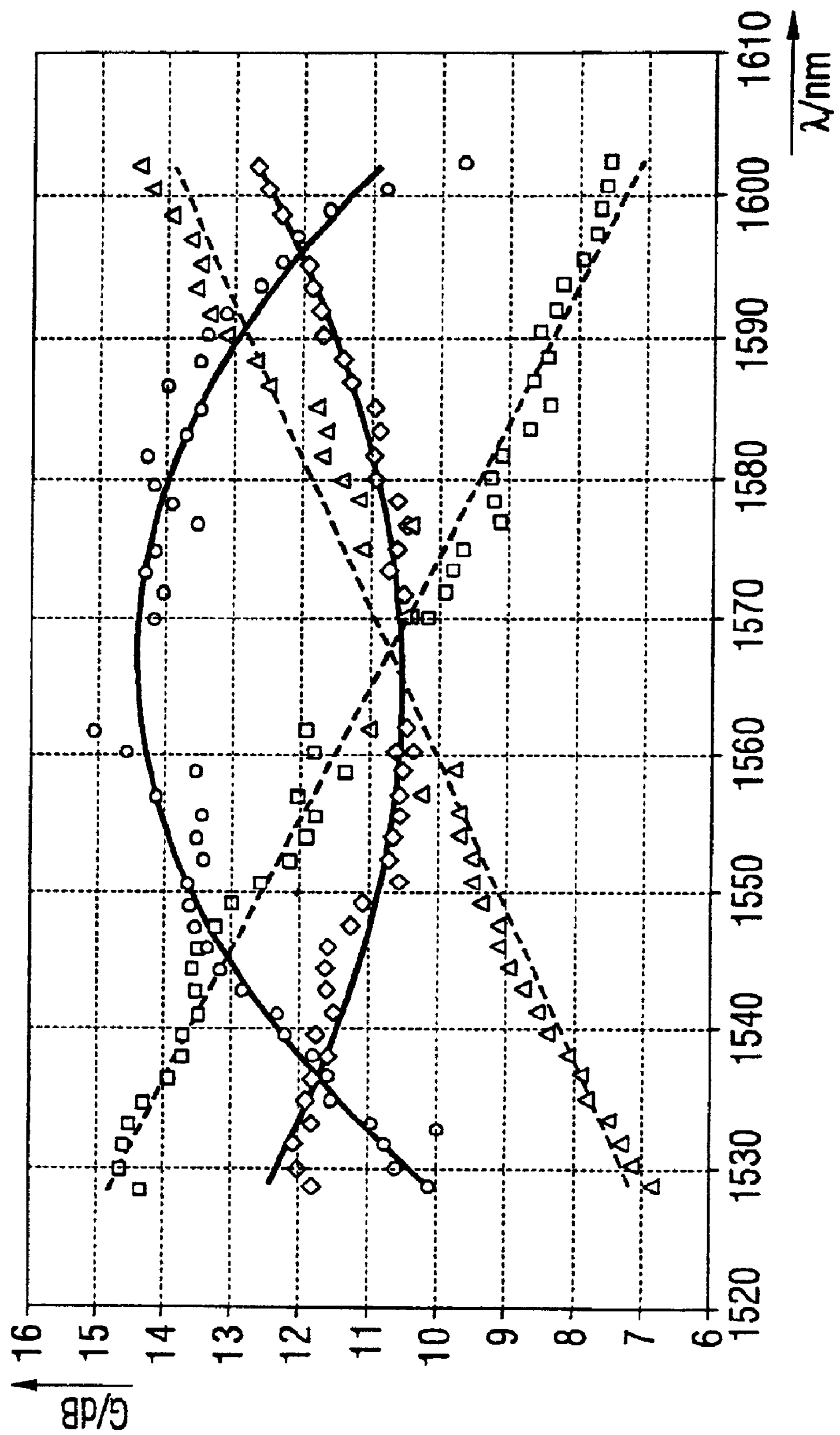
FIG. 3 shows a number of Raman gain profiles which can be set differently.

FIG. 3 shows a number of Raman gain profiles G which can be adjusted differently, as a function of the wavelength $\lambda$, which can be newly selected in order to compensate for and optimize the quality parameter Q or BER. This readjustment is carried out by appropriate control of the pump currents of the pump source, which has a number of different wavelengths, on at least one of the Raman amplifiers $RV_1$, $RV_2$, . . . . This readjustment compensates firstly for signal distortion, for example originating from nonlinear effects, and secondly for gain irregularities caused by channel level OSNR differences, such as misalignments along the transmission path. The Raman gain profiles are not necessarily linear and/or constant in comparison to conventional amplification methods, but may have an adapted variable spectrum depending on the distribution of the pump currents of the pump source.

Figure 4:
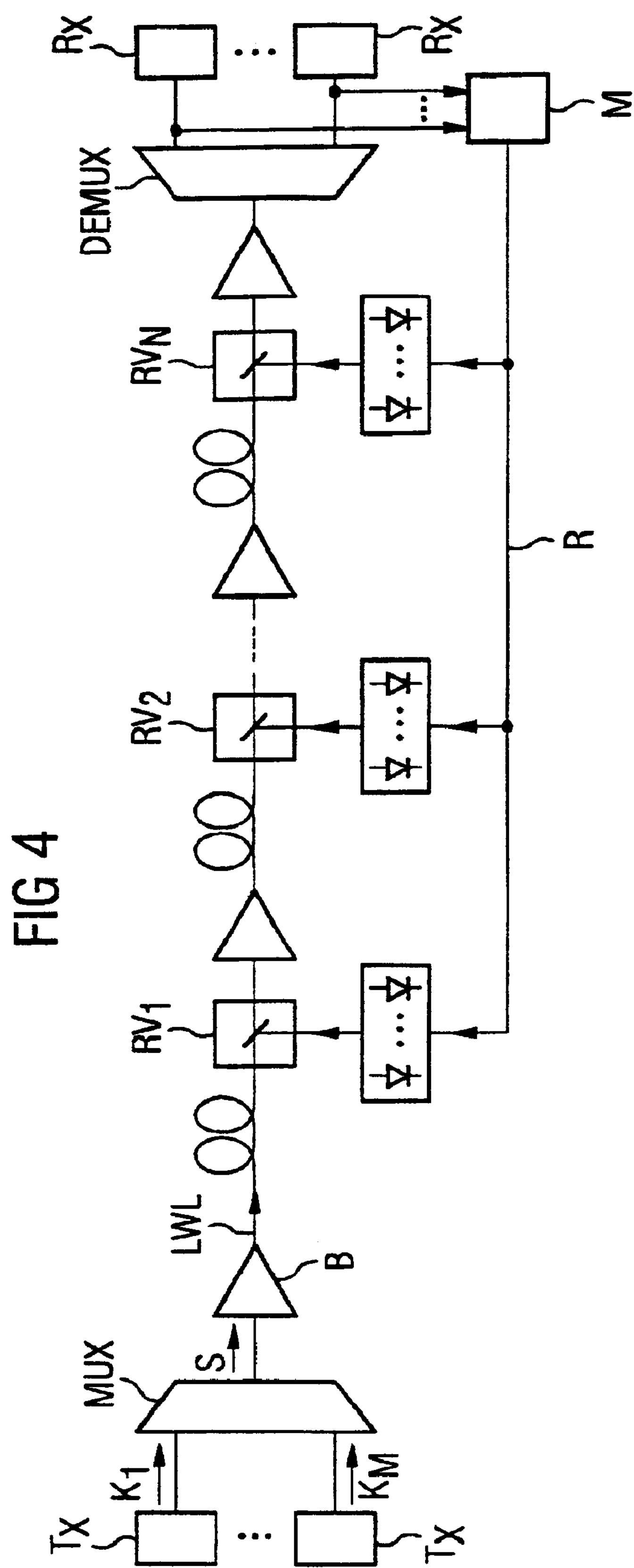
FIG. 4 shows the transmission system based on the method according to the present invention.

FIG. 4 shows a transmission system based on the method according to the present invention with N cascaded Raman amplifiers $RV_1$, $RV_2$, . . . , $RV_N$. At the start of the transmission path, the channels $K_i$ ($0<i<m$) (which originate from m transmitters $T_x$) of the WDM signal S are combined via a multiplexer MUX into an optical fiber LWL and are also preamplified by via a booster B before being transmitted through N serial sections, each having a Raman amplifier $RV_i$. At the end of the transmission path, the channels $K_i$ are subjected to preamplification and are passed through a demultiplexer DEMUX to m corresponding receivers $R_x$, where they are received. The m receivers $R_x$ are followed by a measurement device M which determines the quality parameter Q or BER for each channel $K_i$. A spectrum of the quality parameter Q or BER is produced, and corresponding Raman gain profiles obtained from this spectrum are allocated to the respective Raman amplifiers $RV_1$, $RV_2$, . . . , $RV_N$ in order to compensate for and optimize the quality parameter Q or BER. A controller R for setting the different Raman gain profiles is connected to the measurement device M and to each of the Raman amplifiers $RV_1$, $RV_2$, . . . , $RV_N$ in order to make it possible to control the corresponding pump currents for the pump source for the Raman amplifiers $RV_1$, $RV_2$ . . . , $RV_N$.

Since no pre-emphasis is required for the WDM signal S at the start of the transmission path, the signal distortion remains limited, and can be compensated for correctly by controlling the respective Raman gain profiles based on the analysis of the spectrum of the quality parameter Q or BER.

Although the present invention has been described to reference with specific embodiments, those of skilled in the art will recognized that changes may be made thereto without departing from the spirit and scope of the present invention as set forth in the hereafter appended claims.

What is claimed is:

1. A method for optimization of transmission characteristics of a wavelength division multiplex system having cascaded Raman amplifiers, each having a plurality of pump sources, for amplification of a WDM signal having a plurality of channels, the method comprising the steps of:

determining bit error rate for each channel at a transmission path end;

producing a spectrum for the bit error rate;

selecting different Raman gain profiles of at least one of the Raman amplifiers for compensation for and optimization of the bit error rate as a function of a spectrum of the bit error rate; and setting corresponding Raman gain profiles of the Raman amplifiers by re-adjustment of pump currents of the pump source.

2. A method for optimization of transmission characteristics of a wavelength division multiplex system as claimed in claim 1, wherein the bit error rate is calculated from a respective amplitude histogram determined for each of the channels.

3. A method for optimization of transmission characteristics of a wavelength division multiplex system as claimed in claim 1, wherein the bit error rate is a Q-factor.

4. A method for optimization of transmission characteristics of a wavelength division multiplex system as claimed in claim 1, wherein, in a case of secured data transmission with an error-correcting code, the bit error rate is determined by a number of corrected bits.

5. A method for optimization of transmission characteristics of a wavelength division multiplex system as claimed in claim 1, wherein the pump currents of the Raman amplifiers are controlled such that the Raman gain profiles of each Raman amplifier can be set individually.

6. An optical transmission system having a plurality of cascaded Raman amplifiers, each having a plurality of pump sources, for transmission of a wavelength division multiplex signal having a plurality of channels, the system comprising:

a measurement device for determining a quality parameter arranged at an end of a transmission path; and a control device, connected downstream from the measurement device, via which different Raman gain profiles can be set for at least one of the Raman amplifiers such that the quality parameter is compensated for and optimized for the respective channel, wherein the quality parameter is one of a Q-factor and a bit error rate.

7. An optical transmission system as claimed in claim 6, wherein pump 20 currents of the pump source for each Raman amplifier can be adjusted via the controlled device to produce the respective Raman gain profiles.

8. An optical transmission system as claimed in claim 6, wherein the control device is designed such that pump currents of the pump source can be set differently for each individually Raman amplifier.

* * * * *